US008646721B2

(12) United States Patent
Chapman et al.

(10) Patent No.: US 8,646,721 B2
(45) Date of Patent: Feb. 11, 2014

(54) FLUID DYNAMIC DEVICE WITH THRUST CONTROL SHROUD

(75) Inventors: Greg Chapman, Balcatta (AU); Jakub Kawka, Alexander Heights (AU); Christopher Kim Schlunke, City Beach (AU)

(73) Assignee: Entecho PTY Ltd., Osbourne (AU)

( * ) Notice: Subject to any disclaimer, the term of this patent is extended or adjusted under 35 U.S.C. 154(b) by 343 days.

(21) Appl. No.: 12/990,964

(22) PCT Filed: May 7, 2009

(86) PCT No.: PCT/AU2009/000566
§ 371 (c)(1),
(2), (4) Date: Mar. 16, 2011

(87) PCT Pub. No.: WO2009/135260
PCT Pub. Date: Nov. 12, 2009

(65) Prior Publication Data
US 2011/0155860 A1    Jun. 30, 2011

(30) Foreign Application Priority Data

May 7, 2008    (AU) ............................... 2008902226

(51) Int. Cl.
*B64C 29/00*    (2006.01)
*B64C 29/02*    (2006.01)
*B05B 12/00*    (2006.01)

(52) U.S. Cl.
USPC ...... 244/23 A; 244/12.2; 244/12.5; 244/23 C; 244/23 D; 244/23 R; 239/265.39

(58) Field of Classification Search
USPC ........ 244/23 A, 12.2, 73 C, 23 D, 23 C, 12.4, 244/12.5; 415/206, 211.1; 60/228, 771, 60/229, 230, 232; 239/265.19, 265.25, 239/265.27, 265.39
See application file for complete search history.

(56) References Cited

U.S. PATENT DOCUMENTS 3,051,414 A    8/1962    Frost
3,107,071 A    10/1963    Wessels
(Continued)

FOREIGN PATENT DOCUMENTS

AU    2008202134 A1    12/2008
EP    1916405 A2    4/2008

OTHER PUBLICATIONS

Restrick, K.; International Search Report; Australian Patent Office; Jul. 1, 2009, p. 1; Australia.
(Continued)

*Primary Examiner* — Tien Dinh
*Assistant Examiner* — Marc Burgess
(74) *Attorney, Agent, or Firm* — Ballard Spahr LLP

(57) ABSTRACT

A fluid dynamic device (100) for directing fluid flow to generate thrust comprising a thrust control shroud (130) disposed about a central axis (210) of said fluid dynamic device (100) for directing a fluid flow between an upstream fluid intake region (220) and a downstream fluid exit region (222), forming a fluid exit area, of said shroud (130) to generate thrust wherein a displacement of said fluid exit region (222) of said shroud (130) with respect to said central axis (210) results in a translation of said fluid exit area (222) such that the level of shear stress induced in that part of the shroud (130) disposed laterally to the direction of translation of the shroud (130) is minimized.

17 Claims, 10 Drawing Sheets

(56) References Cited

U.S. PATENT DOCUMENTS

| | | | |
|---|---|---|---|
| 3,288,235 A | 11/1966 | Jones | |
| 4,994,660 A * | 2/1991 | Hauer | 239/265.41 |
| 5,039,014 A * | 8/1991 | Lippmeier | 239/265.39 |
| 5,269,467 A * | 12/1993 | Williams et al. | 239/265.41 |
| 5,351,888 A * | 10/1994 | Taylor et al. | 239/127.3 |
| 5,437,411 A * | 8/1995 | Renggli | 239/265.39 |
| 5,485,959 A * | 1/1996 | Wood et al. | 239/265.41 |
| 6,067,793 A | 5/2000 | Urruela et al. | |
| 6,192,671 B1 * | 2/2001 | Elorriaga | 60/230 |
| 6,195,981 B1 * | 3/2001 | Hanley et al. | 60/204 |
| 6,212,877 B1 * | 4/2001 | Renggli | 60/232 |
| 6,450,445 B1 * | 9/2002 | Moller | 244/23 A |
| 7,147,183 B1 | 12/2006 | Carr et al. | |
| 7,857,256 B2 * | 12/2010 | Hatton | 244/12.2 |
| 8,181,902 B2 * | 5/2012 | Schlunke | 244/12.2 |
| 2004/0237534 A1 | 12/2004 | Webster et al. | |
| 2006/0214052 A1 | 9/2006 | Schlunke | |

OTHER PUBLICATIONS

Restrick, K.; International Preliminary Report on Patentability; Australian Patent Office; Apr. 9, 2010; p. 1-4; Australia.

* cited by examiner

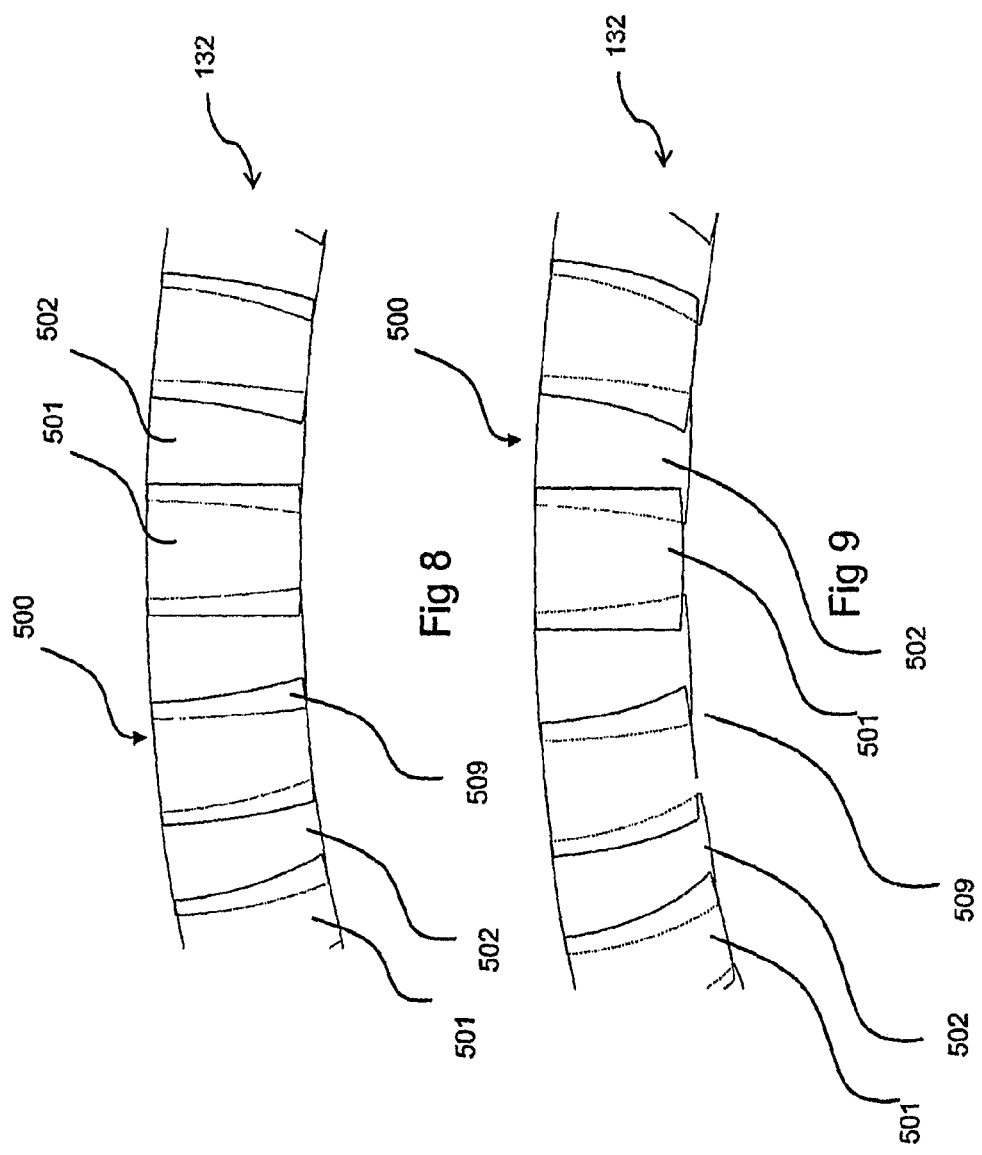

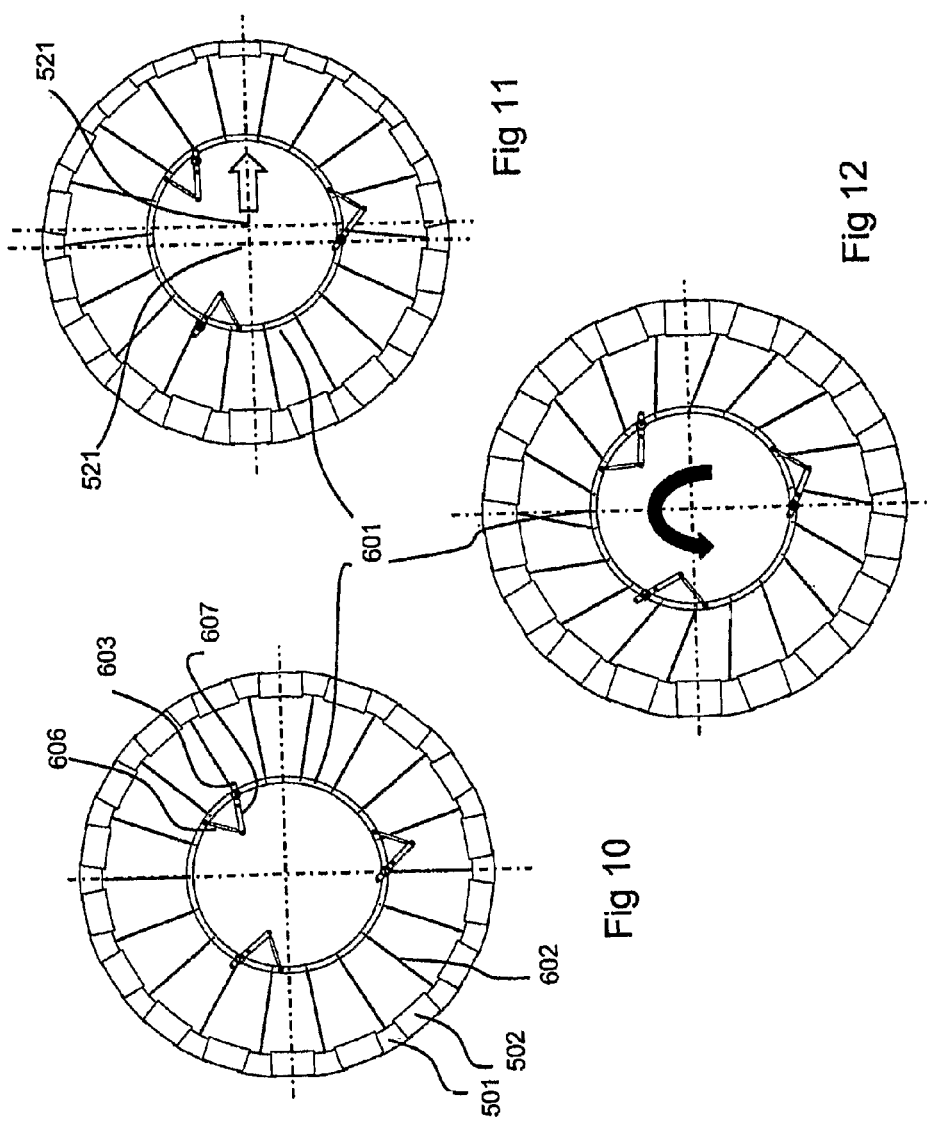

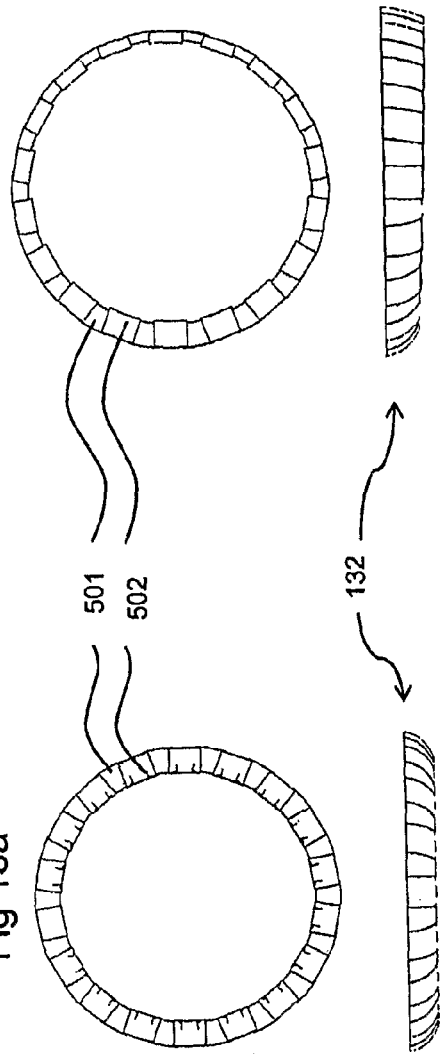
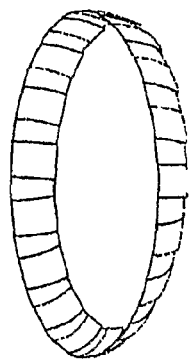
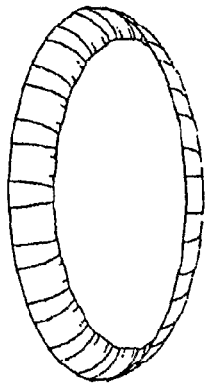
Fig 14a
Fig 14b
Fig 14c
Fig 13a
Fig 13b
Fig 13c

FLUID DYNAMIC DEVICE WITH THRUST CONTROL SHROUD

CROSS REFERENCE TO RELATED APPLICATIONS

This application is a National Stage application based on International Patent Application No. PCT/AU09/000566, filed May 7, 2009 which claims priority to Australian patent application No. 2008902226, filed May 7, 2008 the disclosures of which are incorporated herein by reference This invention relates to a fluid dynamic device with a thrust control or thrust vectoring shroud. The invention is particularly useful for use in aerodynamic lifting devices using drum rotor type fans for thrust generation and airborne craft incorporating such devices.

The applicant has developed a new type of airborne craft capable of hovering in a stationary position while airborne.

Powered airborne craft, manned and unmanned, may be capable of hovering in a stationary position while airborne. Such aircraft may range from craft which operate close to the ground relying on a cushion of air to those capable of free flight and vertical takeoff and landing. Craft operating close to the ground may be designed for transportation and recreational use whereas the free flight craft may operate at generally low altitudes compared to commercial aircraft and may be considered for applications including airport-to-downtown shuttle, home-to-office commuting, search and rescue and surveillance operations.

The most common craft that hovers close to the ground is the hovercraft which is generally a craft used for recreational and general transport and ferry duties. This craft has a number of disadvantages that have limited its penetration of markets for motorized recreational products and general transportation of personnel and goods.

One important limitation of such craft is the inability to operate over terrain with obstacles of significant size such as waves, boulders, riverbanks and the like because close contact must be made with the ground to avoid the leakage of the air cushion. Any increase in the operating height of the hovercraft is accompanied by an unrealistic horsepower requirement. A further notable limitation is the inability to develop significant lateral thrust for acceleration, braking, climbing gradients and changing direction with realistic horsepower requirements despite the use of separate fans for developing this lateral thrust. In general, the "footprint" of the hovercraft is acceptably small for its lifting capacity because the entire area under the craft and an appropriate peripheral skirt encapsulates an air cushion which can operate at sufficient pressure with low power requirements provided that the clearance between the grounds and the skirt is small so as to minimize air leakage. In effect the air cushion of a hovercraft provides a low friction sliding surface over which the hovercraft may move.

The most common and widely employed free flying vertical takeoff and landing (VTOL) craft that operates at higher altitudes is the helicopter. The success of this vehicle is due to the urgent need for this VTOL capability and the ability to achieve hovering flight with acceptable power consumption because of the very large amount of air that is contacted by the large diameter lightweight blade structure. The main undesirable characteristic of helicopters is the long rotating blades, which are a hazard to personnel and to the aircraft itself should they strike anything in the area and the very large footprint or minimum safe space requirements that these aircraft require, particularly during takeoff and landing.

Further undesirable characteristics include the requirement for a remotely mounted propeller to counteract torque reaction of the airframe to the drive of the main rotor, complicated and relatively fragile rotor blade attack-angle controls, high maintenance requirements and rotor blades which must be long, thin, and relatively light and thus are flexible and subject to fatigue problems. Add to this incomplete list of limitations the fact that failure of any one of these components is likely to have catastrophic consequences for the aircraft and all on board and it is evident that an alternative design is desirable.

In a craft free of ground effect, lift can be generated by the acceleration of a mass of air by a fan, propeller, wing, or other system. When a mass of air is changed from rest to a given velocity in a downward direction, an upwardly directed reaction force is produced. In general, the more air that is directed, the less power is required to produce a given lift. This defines the technical challenge which this invention seeks to address because increasing the volume of air generally involves an increase in the size of the craft as evidenced in the large diameter, high speed blades used in helicopters.

The rotor blades of a helicopter develop lift by accelerating air downward and parallel to the axis of its rotation (axially). The velocity of the tip of the rotor blade is typically set to a maximum that is close to sonic (Mach 1) conditions (being approximately 1250 km/hr (ie approximately 350 m/s) at sea level and normal temperatures) on the advancing blade when the helicopter is at maximum forward speed (typically helicopters are limited to forward speeds of about 320 km/hr, and blade tip speeds relative to the helicopter itself are of the order of 900 km/hr ie 250 m/s). The remainder of the blade must operate at a lower velocity proportional to its distance from the axis of the rotor. Unfortunately this non-uniform velocity along the blade means that significant blade length is underutilized despite varying the angle of attack and changing the aerodynamic profile along the length of the rotor blade. To compound the problems of the rotor, because the highest lift is generated at the highest velocity region, at the tip, very high bending moments are generated on this cantilevered structure. Further, to get the maximum lift from the rotor, the blade tip must operate at the highest permissible velocity close to sonic conditions, which means that considerable noise is generated. Correspondingly the rotor diameter cannot be reduced because to generate the same lift, the velocity would have to increase beyond sonic conditions or some part of the operating envelope would have to be compromised.

Further, and within the class of airborne hovering craft capable of free flight using fans to generated subsonic airflows, it is desirable to achieve a compact packaging arrangement which provides for a centralized payload location and high levels of aerodynamic control authority. Furthermore it is highly desirable to provide such airborne craft with an increase in payload or lift at the same or reduced power in order to improve fuel efficiency and operating cost.

The applicant has therefore developed a new aerodynamic lifting device for airborne craft that provides a more compact form of craft and which uses fan blades which are more evenly loaded than comparable helicopter blades. The device uses a drum fan type rotor in an airborne craft with a relatively small footprint. The fan may be described as a drum rotor or radial drum fan, that is, a fan with the blades advantageously occupying an annular region having a radial depth that is less than 25% of the radial pitch of the blades. By placing the rotor blades at a distance from the rotation axis of the fan, a central region within the rotor is conveniently provided for a payload, or in the case of a larger sized craft, a pilot and/or passengers.

The use of such a drum rotor type fan also provides other benefits. One such benefit is that effectively the entire length of a blade is being fully utilized as an aerodynamic device (as compared to the tip of the helicopter blade, described above) since it is vertically disposed and the airflow is radial. Additionally, the design of the drum rotor allows for each blade to be supported at either end via upper and lower support rings (again, as opposed to the cantilevered design of the helicopter blade). Also, simple constant cross-section blade profiles may be used which offer manufacturing cost savings (as opposed to helicopter blades which utilize a complex lengthwise twist to provide the proper angle of attack along the length of the blade).

As has been discussed above, whilst measures can be taken to balance the torque required to drive the fan (e.g. by using appropriate stator blades or utilising rudders in the outflow air stream (as discussed further below), the use of counter-rotating rotors may also be implemented. Options here include using a single or counter-rotating rotor, or stator blades on the inner or outer, or both, sides of the rotor.

The drum fan type rotor generates air flow in a primarily radial direction. Conveniently, in order to generate lifting thrust this air flow is re-directed, by means of a shroud that surrounds the rotor, from the radial out flow direction as provided by the rotor to a generally downward direction to thus produce an upward thrust.

In one form the shroud comprises a flexible skirt attached to the area around the top part of the rotor. In this form the shroud may conveniently (and interchangeably) be referred to as skirt. However, this is to be contrasted to the skirt of a conventional hovercraft which simply maintains a close contact with the ground rather than providing a means to deflect the airflow to provide thrust and directional control of the airborne craft.

By movement of the exit area of the flexible skirt relative to the craft a directional nozzle type effect can be used to control the thrust direction of the exiting air (ie the effective centre of action of the thrust) and/or change the centre of lift (being the effective location through which the lifting thrust acts on the craft) in relation to the centre of gravity of the craft and thereby apply a torque to the craft. The exit area of the skirt may be moved by translation in a plane, or may pivot so that one part of the exit area of the skirt rises whilst another part dips in relation to the craft. By manipulating the exit area in this fashion, the thrust vector and/or centre of lift (also referred to as the centre of pressure) can be altered. As yet a further alternative, all or at least a lower portion of the shroud may translate with respect to the craft thus moving the centre of pressure with respect to the centre of gravity of the craft. In this latter case the shroud may be rigid and move as a solid body in translation to effect the change in the centre of lift. Rotational motion of the skirt (in the roll or pitch direction) may be superimposed and independently controlled to the translational motion. Using a shroud in any of the above configurations has the benefit that all of the air that is used to generate thrust is also being acted upon by the shroud to control the craft attitude.

In current designs of the shroud developed and tested by the applicant, it has been found that the relative translational motion between the lower part of the shroud (ie at the exit region) relative to the upper part of the shroud (which is fixed to the body of the craft) requires parts of the shroud to undergo shear stress. This shear stress tends to inhibit the motion of the lower part of the shroud which in turn tends to reduce the effectiveness of the shroud as a thrust vectoring device.

Therefore, the applicant has also designed and developed semi-rigid shrouds that have orthotropic characteristics in that the shroud may be relatively stiff in one or more direction (s) of stress and relatively flexible in the other direction(s). For example, the shroud may be predominately or at least in part, constructed of a flexible sheet or fabric material which may be stiff in one direction of force, but may be relatively flexible in the orthogonal direction. For instance the top portion of the shroud may be rigid with only a lower portion being flexible. Alternatively, certain sections of the shroud along its circumferential extent may be rigid, with intermediate sections being flexible.

However, the Applicant has found such shrouds to be subject to significant shear forces which may require increased actuation forces and/or increased motion of the shroud. While such a shroud gives satisfactory performance, a fluid dynamic device with an improved shroud less subject to problems such as this would be desirable.

Accordingly, the present invention provides a fluid dynamic device for directing fluid flow to generate thrust comprising a thrust control shroud disposed about a central axis of said fluid dynamic device for directing a fluid flow between an upstream fluid intake region and a downstream fluid exit region, forming a fluid exit area, of said shroud to generate thrust wherein a displacement of said fluid exit region of said shroud with respect to said central axis results in a translation of said fluid exit area such that the level of shear stress induced in that part of the shroud disposed laterally to the direction of translation of the shroud is minimised.

The shroud of the fluid dynamic device reduces the shear forces generated by the shroud and thus allows for reduced actuation forces and/or increased motion of the shroud. Increased motion of the shroud allows for greater control forces to act on the airborne craft improving directional control. Reduced actuation forces allow for greater actuation speed which enhances the responsiveness and controllability of the craft. Such an improved shroud also allows the size of the exit area of flow through the shroud to be controlled during operation.

Preferably, the displacement of the fluid exit region of the shroud results in at least some lateral portion of said exit region of said shroud being displaced inwardly towards a centroid of said fluid exit area whilst at least another portion of said exit region of said shroud is displaced outwardly away from said centroid. A reference to "centroid" is a reference to the geometric centre of area of the fluid exit area of the shroud.

Preferably a displacement of the centroid of the fluid exit area results in a change of position of the centre of thrust acting on the fluid dynamic device.

Preferably the fluid flow is air flow generated by a powered fan.

The fluid exit region of the shroud may be considered as being defined by a plurality of shroud portions. Each such shroud portion is configured such that a translation of the fluid exit area results in predominately radial displacement of each such shroud portion with respect to the central axis of the fluid dynamic device.

By providing for predominately radial displacement or motion of the lower part of the shroud, the shear stress generated by motion of the shroud can be minimized or effectively eliminated.

Preferably, translation of the fluid exit area of the shroud by an actuating means in a first direction results in a radial inward displacement of those shroud portions of the shroud that are disposed laterally (or orthogonally) to said first direction. Such translation of the exit area of the shroud may result in at least some shroud portion(s) defining the fluid exit portion of the shroud moving radially outwardly and at least another shroud portion moving radially inwardly with respect to the central axis.

Translation of the fluid exit area of the shroud will result in a change of position of the centroid of such area with respect to the central axis and/or with respect to the centre of gravity of the device. This will result in a thrust vector which will produce a torque about the centre of gravity of the device which can be used to control the attitude of the device or an airborne craft incorporating it.

Preferably, the shroud portions are in the form of petals. The petals are movable, preferably independently.

Preferably, the petals are movable as a result of a degree of flexibility.

Alternatively, petals are hinged at an upper region of each petal with movement being accommodated by an integral hinge.

Preferably, the petals are disposed circumferentially about the shroud and each petal is disposed between circumferentially adjacent petals. Preferably, each petal overlaps with and is sealingly engaged with an adjacent petal. This will ensure that any fluid leakage between the petals is minimised.

The petals may be formed by a series of castellations in the shroud with each alternate (odd numbered) petal being disposed on the inner side of a series of outer (even numbered) petals. The castellations are conveniently disposed about the central axis of the shroud.

Preferably, the inner and outer set of petals are overlapped so as to seal against fluid flow between them.

Preferably, an actuation means actuates the petals to translate the exit area of the shroud. The actuation means may be of mechanical and/or electrical nature.

Preferably, the actuation means comprises an actuating ring, such ring being actuated by at least one actuator, the actuating ring having connection means connecting the ring to at least one petal, wherein movement of the actuating ring by the at least one actuator results in movement of the said at least one petal.

Preferably, each of the outer petals, that is the outer or even numbered petals, are connected to the actuating ring by individual connection means, wherein radially inward displacement of an outer petal due to the overlap between the petals, pulls at least adjacent inner petal(s) inwardly.

By attaching only the outer petals to the actuating ring, the complexity and weight of the shroud actuating system can be reduced. The overlap of the outer petals with the inner petals not only ensure that fluid leakage is minimized but also provides a force transfer path from the outer petal to the inner petal.

Conveniently, the petals may be actuated by an actuation means which comprises a plurality of actuators. For example, at least three independently controlled actuators may be included. Whilst two actuators may be sufficient to provide translation control of the shroud, at least one actuator may be provided allowing for control of rotation of the actuator ring about its own axis. By rotating the ring about its own axis, all or substantially all of the petals are caused to move radially inwardly to thereby reduce the size of the fluid exit area. Furthermore, a control system may control operation of at least one of the actuators so as to produce both a constriction of the fluid exit area, and a translation of the fluid exit area with respect to the central axis of the fluid dynamic device. Constricting the air flow in this way provides a convenient means of modulating the thrust output of the device which when applied to an airborne craft provides an effective attitude control means independent of fan speed.

Alternatively, petals may be constructed of material(s) which undergo a change of shape upon application of electrical inputs and actuation of a petal may be through direct electrical control. To this end, the material could—for example—be a piezoelectric material.

Preferably, the shroud has a neutral position, wherein predominately all of the fluid exiting the exit region of the shroud is directed towards the central axis of the fluid dynamic device.

Preferably, the fluid entering the fluid intake region of the shroud enters in a radial direction to the central axis of the fluid dynamic device. Such an arrangement is convenient when using a radial flow fan such as the applicant drum rotor type fans.

Alternatively, the fluid enters the fluid intake region of the shroud in a direction parallel to the central axis of the fluid dynamic device. This arrangement is convenient in the case that axial flow fans are to be used to generate the fluid flow.

Preferably, the fluid dynamic device comprises at least one drum rotor fan for generating radial air flow from an inner region of the rotor of the fan to an outer region of the rotor of the fan. Conveniently, the airflow emanating from rotor of the fan enters the intake region of the shroud, is directed or re-directed by the shroud to generate thrust, the airflow exiting the shroud at the fluid exit region.

Preferably, the fluid dynamic device is an airborne craft and the shroud is used to direct airflow in a generally downward direction to create a lifting thrust for the airborne craft. The airflow may advantageously be directed downward through an annular shaped fluid exit region or area to generate thrust.

Preferably, the shroud is disposed about a longitudinal axis of the airborne craft, said axis being in the same direction as the thrust generated by the airborne craft.

Preferably, the fluid exiting the fluid exit region is directed at an acute angle towards the central axis of the shroud. For the sake of clarity, an angle of 90 degrees means that the air flow is orthogonal to the axis of the shroud, and an angle of 0 degrees means that the air flow at the exit region is parallel to the axis of the shroud.

Preferably, the angle of the airflow exiting the shroud is between 45 and 90 degrees to the central axis of the shroud. In tests conducted by the applicant it has been found that directing the airflow at 90 degrees to the exit of the shroud produces a desirable thrust characteristic for an airborne craft particularly when in free flight and away from any ground effect.

Preferably, fluid or air directed between the intake region of the shroud and the fluid exit region of the shroud is directed through a total angle of greater than 90 degrees.

An airborne craft incorporating the fluid dynamic device as described above forms another aspect of the invention.

The fluid dynamic device and airborne craft of the invention may be more fully understood from the following description of preferred embodiments thereof made with reference to the accompanying drawings in which:

FIGS. 8 & 9 show a close up view of the lower fluid exit region of the thrust control shroud when in the neutral condition, and when in the deflected condition, respectively.

FIG. 10 shows a top view of the lower exit region of the thrust control shroud when in the neutral position.

FIG. 11 shows a top view of the lower exit region of the thrust control shroud when in a deflected position.

FIG. 12 shows a top view of the lower exit region of the thrust control shroud when the shroud is pulled inwardly to reduce the size of the exit area.

FIGS. 13a, 13b & 13c shows a top view, side view and isometric view of the lower exit region of the thrust control shroud when in a neutral position.

FIGS. 14a, 14b & 14c shows a top view, side view and isometric view of the lower exit region of the thrust control shroud when in a deflected position.

Figure 1:
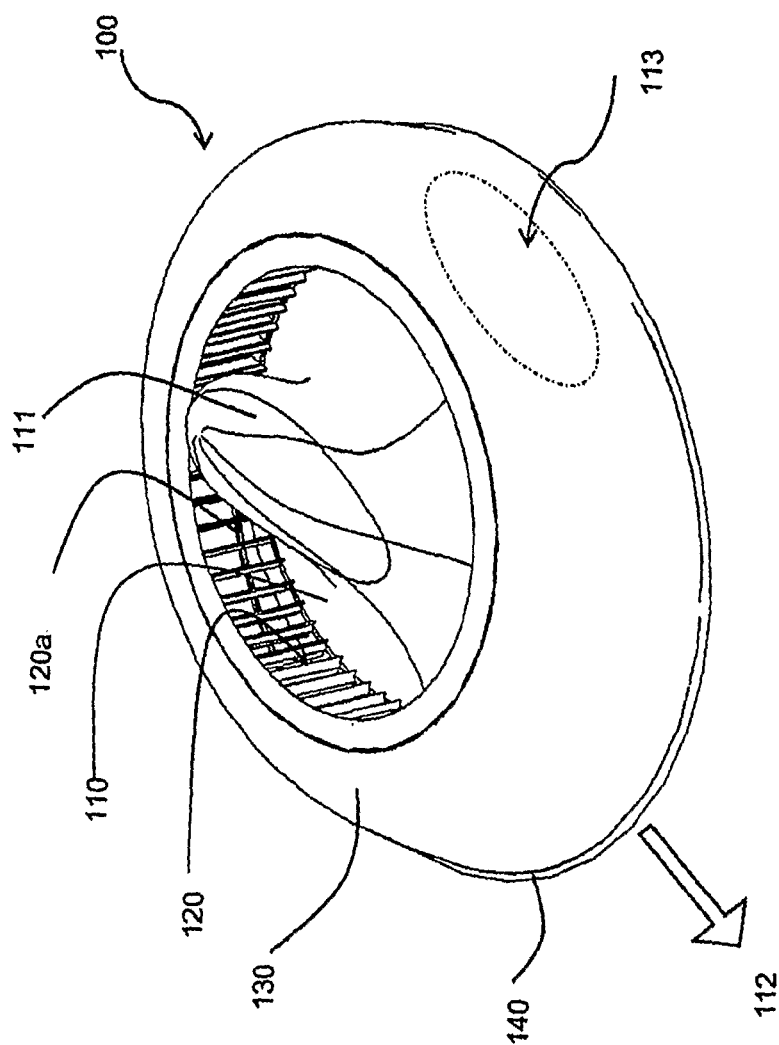
FIG. 1 is a schematic drawing of an airborne craft adapted to be piloted by an operator and which uses a flexible shroud for thrust vectoring.

Referring to FIG. 1, there is shown an airborne craft 100 which has been developed by the applicant and which is intended to be used in a wide variety of applications. The craft 100 is approximately 2.4 meters wide and comprises a central load carrying space 110 that provides a cockpit operating area 111 for an operator (not shown) while maximizing the area available for fluid flow, that is airflow, into the drum rotor fan 120. The operator may be seated in the cockpit 111 facing forward (as indicated by arrow 112). The air flow to the drum rotor fan 120 flows via the central area of the craft (that is, through the central load carrying space 110) and is expelled radially by the rotor fan 120. The radial airflow is re-directed downwards by a shroud 130. The shroud 130 is formed of a flexible material. The lower part of the shroud comprises a rigid outer rim 140. This rim 140 is movable by the operator so that the shroud 130 can be deflected to thereby change the position of the exit area of the shroud 130 with respect to the craft 100. The flexible shroud 130 is shown in a forward deflected position (the forward direction being indicated by arrow 112) as may be used to effect a braking or reversing maneuver.

It should be noted that the deflection of the shroud 130 as depicted in FIG. 1 tends to cause a shear stress in the region of the shroud 130 indicated at 113 (and on the other side of the craft, not shown) being a region that is lateral (or orthogonal) to the direction of translation 112 of the shroud 130. This shear stress tends to increase the forces required to move the lower part of the shroud 130 and/or reduce the response time of the actuation system for controlling the shroud 130 due to the increased actuation forces required.

Figure 2:
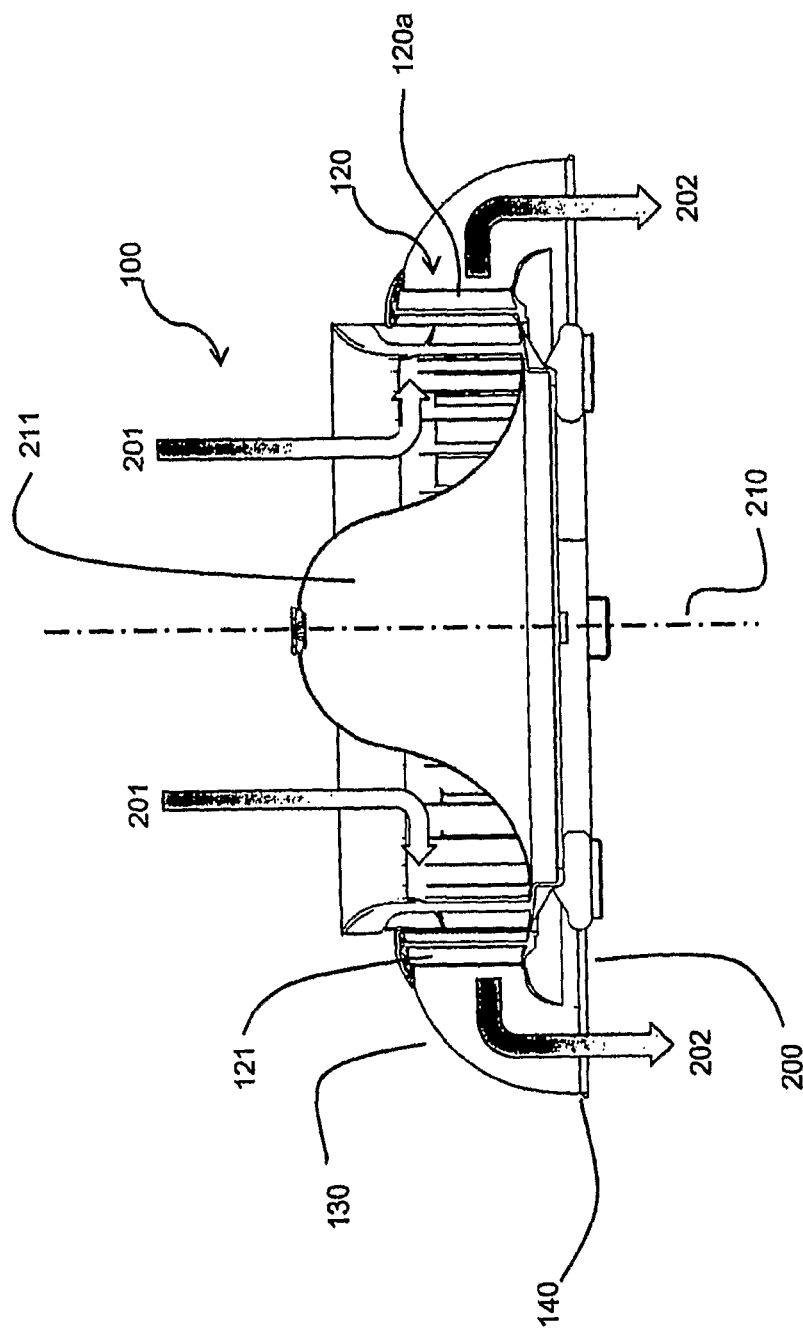
FIG. 2 is a sectional view of an airborne craft similar to the one shown in FIG. 1, adapted for unmanned use.

Referring to FIG. 2, there is an airborne craft 100 of generally the same nature as that shown in FIG. 1 except that it is adapted for UAV (Unmanned Aerial Vehicle) applications. Similar items between the craft 100 shown in FIG. 1 and FIG. 2 use the same reference number. In contradistinction to the craft 100 shown in FIG. 1 the craft 100 shown in FIG. 2 is adapted for autonomous operation and the cockpit area 111 of the craft 100 shown in FIG. 1 is replaced by a payload area 211.

In FIG. 2 the arrows 201 indicate the general direction of airflow into the drum rotor fan 120. The airflow is then deflected by the shroud 130 to a generally downward direction as indicated by arrows 202. It will be noted that the blades of the drum rotor fan, 121, operate in a relatively narrow annular region compared to the diameter of the rotor 120a. This maximises the aerodynamic efficiency of the blades (as they are placed at the maximum working diameter of the rotor 120a) and creates a highly desirable centralised payload region.

As can be best seen in FIG. 2, the shroud 130 of the craft 100 in FIGS. 1 & 2 creates a generally downward facing fluid exit area in the shape of a flat annular ring 200. The airflow exiting the shroud 130 is therefore in a direction generally parallel to a central or longitudinal axis 210 of the craft. Similarly to the case of the craft 100 shown in FIG. 1, the actuation of the hoop 140 of the craft in FIG. 2 causes the shroud 130 to translate with respect to the central axis 210 thereby modifying the airflow through the fluid exit region 200. It will be noted that the use of the rigid hoop 140 requires that all portions of the lower most part of the shroud 130 move as a rigid body.

Figure 3:
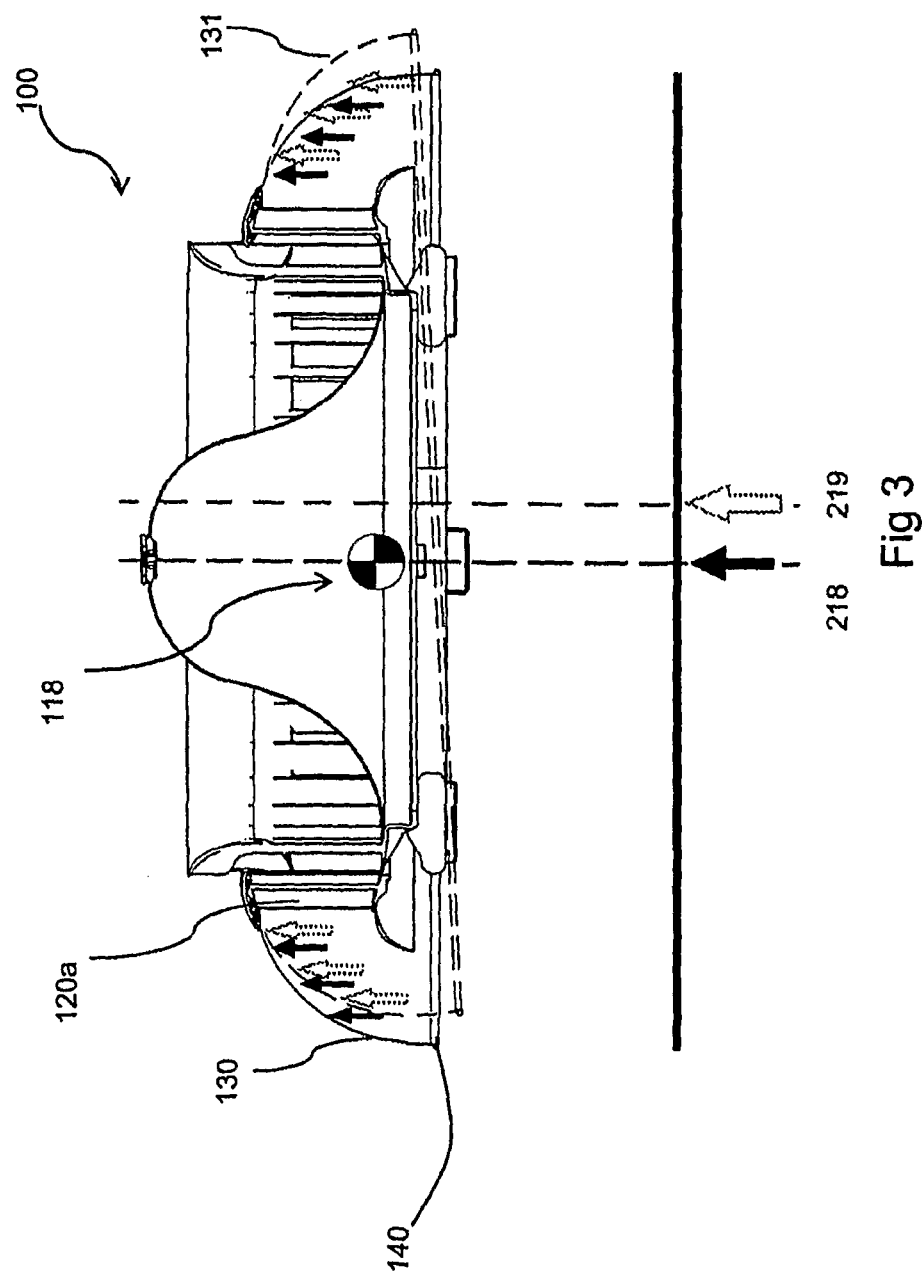
FIG. 3 shows the craft depicted in FIG. 2 with the shroud shown in the neutral and in the deflected position.

Referring to FIG. 3 there is shown a schematic cross-section of an airborne craft 100, similar to the craft shown in FIG. 2.

The airborne craft 100 is generally of a similar nature to that shown in FIGS. 1 & 2 and similar items use the same references as in those earlier figures.

The airborne craft 100 in FIG. 3 is configured to provide an autonomous airborne vehicle capable of free flight as well as vertical take-off and landing, hovering and perch and stare capability.

Referring to FIG. 3, there is shown a neutral position of the shroud 130 and an actuated deflected position 131 (in dotted lines). A resultant force 218 acts through the centre of gravity 118 when shroud 130 is in the neutral position. Actuation of the shroud 130 to the deflected position 131 results in a change in the position of the centre of action of the lifting forces due to movement in location of the resultant force to 219 (although shown as a vertical arrow, the resultant force may also be inclined to the axis of the craft as a result of the vectoring of the airflow out of the shroud 130). This results in a torque being produced about the centre of gravity and the craft 100 rotating in this direction. The resulting tilt of the craft 100 thus vectors the thrust such as to propel the craft laterally. Once the desired level of tilt has been achieved, the shroud 130 is actuated to maintain the desired level of tilt. Although not shown in this Fig, movement of the shroud to the deflected condition 131 may also result in a change of direction of the resultant force vector as well its location.

Figure 4:
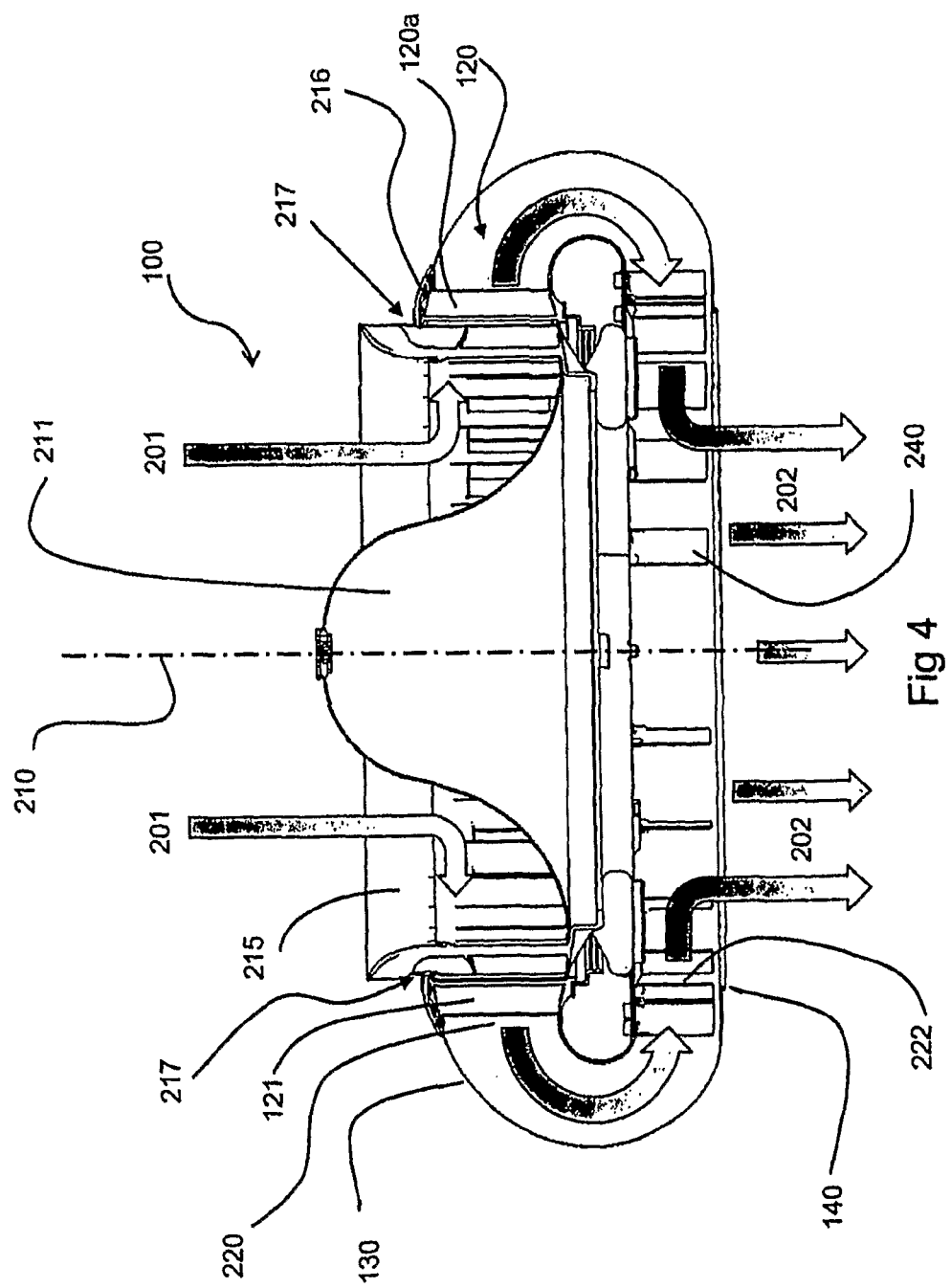
FIG. 4 is a sectional view of the airborne craft based upon the craft depicted in FIG. 2 and using an alternate shroud configuration.

FIG. 4 shows a further variation of the craft 100 shown in FIGS. 2 to 3, in particular highlighting the adoption of a shroud 130 which has an exit region directing air to the central axis 210.

The airborne craft 100 shown in FIG. 4 is adapted for UAV applications having a drum rotor fan 120 with rotor 120a which rotates about a central axis 210 to generate a radially outward airflow, to be subsequently directed or re-directed to generate thrust for the craft 100. Air flow, as generally indicated by arrows 201, flows into a central region of the craft 100, through a stator 215 and into the rotor 120. Airflow is also drawn in from above the stator cap 216 and on the radially outer side of the stator 215—as indicated by arrow 217.

The outlet of the rotor 120a is surrounded by a shroud in the form of a flexible skirt 130 which redirects the air from an upper or upstream fluid intake region 220, through an angle of approximately 180 degrees to a downstream or lower fluid exit region 222.

The airflow emanating from the fluid exit region 222 is at 90 degrees to the axis 210 of the shroud 130. Because the air flow is radially inward towards the axis 210 it is deflected downwardly to produce a thrust as generally indicated by the arrows 202.

The thrust may be vectored by movement of the rim 140 which is attached to the skirt at the lower part of the exit region 222.

Stator blades 240 are provided at the exit region 222. These blades provide a counter acting yaw torque to help to neutralize the yaw torque produced by the airflow through the rotor 120a. These stator blades may be actuated so as to produce varying amounts of yaw torque (both positive and negative) so as to provide attitude control of the craft.

Figure 5:
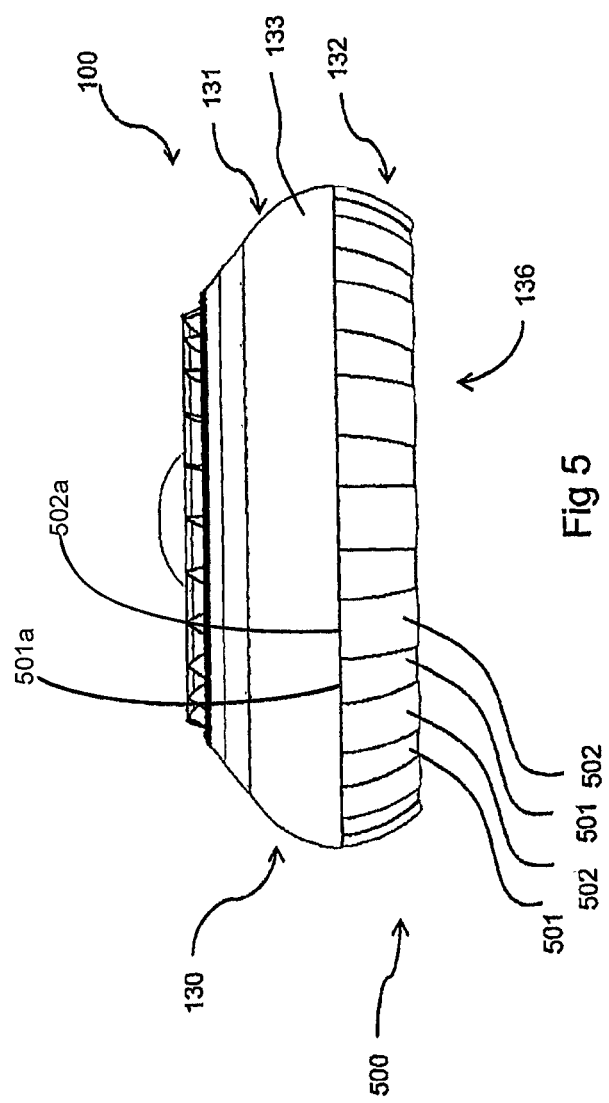
FIG. 5 shows a side view of an airborne craft, similar to that shown in FIG. 4, and utilizing a fluid dynamic device according to a first embodiment of the present invention and showing the thrust control shroud in the neutral position.

FIG. 5 shows an airborne craft 100 adapted for UAV applications incorporating a fluid dynamic device with a shroud 130 according to a first embodiment of the invention. The shroud 130 is depicted in a neutral position, such that the airflow is deflected towards the central axis 210 of the shroud (similarly to that shown in FIG. 4). The particular craft shown is approximately 600 mm in diameter. The craft comprises an outer shroud 130 having an upstream fluid intake region, 131, and a downstream fluid exit region, 132. A drum rotor fan (not shown) of similar design to that shown in the previous Figs. is adopted to generate air flow in a similar fashion to that depicted in FIG. 4.

The upstream fluid intake region 131 of the shroud 130 comprises a relatively rigid skin 133 which redirects radially outward flowing air from the drum rotor and directs it downwardly into the lower exit region 132 of the shroud.

The downstream fluid exit region 132 of the shroud 130 defines the fluid exit area 136 of the shroud. In the neutral position, centroid of the fluid exit area 136 is at the same location as the central axis 210 of the craft 100.

The fluid exit region 132 of the shroud 130 comprises a plurality of shroud portions or flaps in the form of petals, 500, comprising a series of inner petals 501, and a series of outer petals 502, all these petals being of a material with a degree of flexibility and being formed by a series of castellations in shroud 130.

The petals 501, 502 are flexibly hinged via respective flexible hinges 501a and 502a. The hinges are located at upper regions of each petal and connect each petal to the rigid part of the shroud 133.

These petals 501, 502 are controlled by actuators forming part of a control system so as to alter the position and/or direction of the resultant thrust acting on the craft 100 thereby provide a means to control the attitude of the craft 100.

Figure 6:
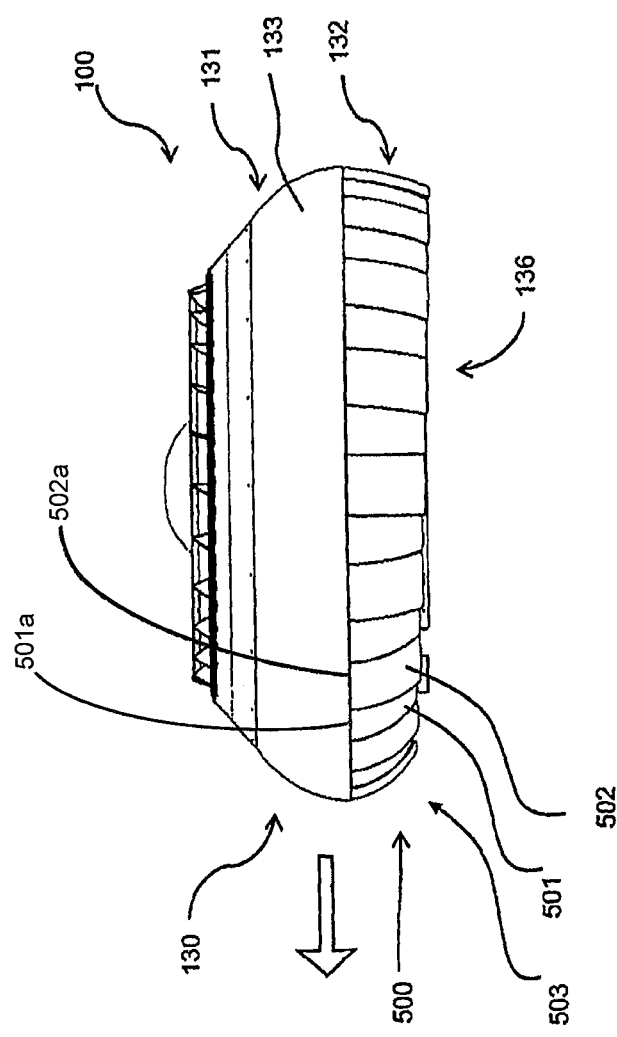
FIG. 6 shows the same craft as shown in FIG. 5 and with the thrust shroud shown in a deflected position.

FIG. 6 shows the same craft as in FIG. 5 and with the fluid exit region. 132, of the shroud 130 in a deflected state. It will be seen that those petals on the left side of the craft, 503, have been deflected radially inwardly towards the centre of the craft 100, whilst those petals on the right side of the craft 100 have deflected radially outwardly, away from the centre of the craft 100. This will result in a component of the thrust acting to move the craft 100 to the left.

Figure 7:
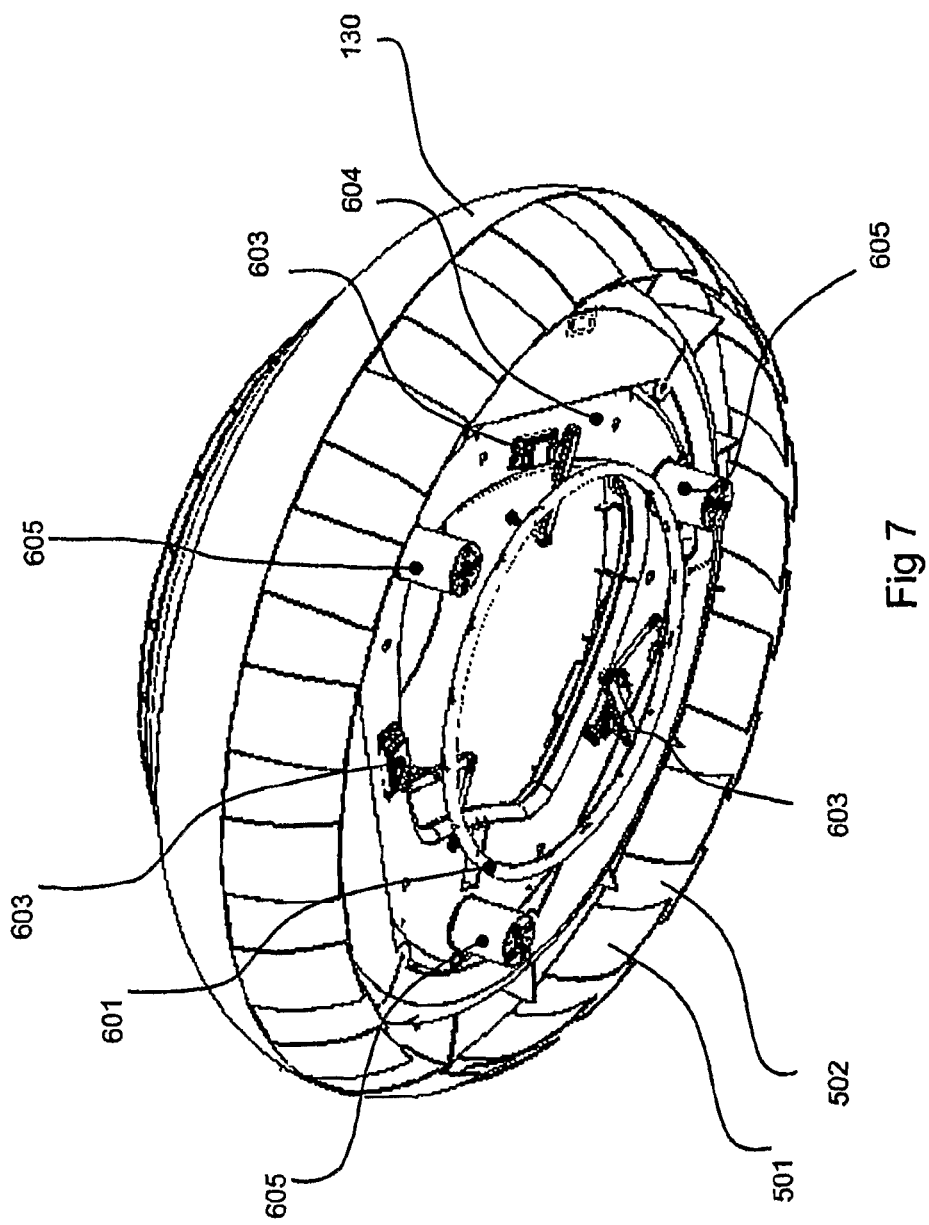
FIG. 7 shows an isometric view, from underneath, of the airborne craft shown in FIGS. 5 & 6.

FIG. 7 shows an isometric view, looking from underneath, of the airborne craft shown in FIGS. 5 & 6 with the shroud, 130, in a neutral position. Also seen in this view are the actuators 603 (3 off, one being provided to enable control of rotation of an actuating ring 601 for petals 501, 502 about the axis of actuating ring 601), chassis 604, and electric motors 605 (3 off), which power the drum rotor fan via a friction drive, not shown) and which also act as landing feet for the craft 100. The friction drive arrangement also serves the purpose of centralizing the rotor within the craft both radially and locating it axially. Also seen in this view is the actuating ring 601, which is moved by the action of the actuators 603 and which in turn moves the outer most petals 502 by connection means in the form of tethers (not shown in this view, and best seen in FIGS. 10, 11 and 12).

FIGS. 8 & 9 show a close up view of a portion of the fluid exit region 132 of the shroud 130. FIG. 8 shows the inner petals, 501, and outer petals, 502 in the neutral position. The petals overlap in the region 509. The degree of overlap of the petals 501, 502 ensures that the leakage of air between the petals 501, 502 is minimized.

FIG. 9 shows the lower exist region 132, of the shroud 130, with the petals is a displaced condition corresponding to the left had side portion of the shroud 130 indicated by reference 503 in FIG. 6. It will be noted that the degree of overlap, 509, is increased as the petals 501, 502 move towards the centre of the craft 100. Conversely, and not shown, the degree of overlap will reduce as the petals move outwardly. The degree of overlap in the neutral position of shroud 130 is therefore chosen so as to ensure that a minimum required degree of overlap is maintained when the petals 501, 502 are at their outermost displacement to ensure a sealing engagement is maintained.

FIGS. 10, 11 and 12 show a view from beneath the shroud 130, with the shroud 130 being in various orientations.

In FIG. 10 there is shown the shroud 130 with a series of inner petals, 501, and adjacent outer petals, 502, in the neutral position. An actuating ring, 601, is mounted within the exit area of the shroud (in a region that does not adversely affect the air flowing out of the shroud). The actuating ring 601 is controlled by actuators 603 (3 off) which are mounted on the chassis, 604, of the craft 100 (as best seen in FIG. 7). Each of the outermost petals, 502, is tethered to the ring 601 by a control tether 602. The control tether may conveniently be in the form of a line or string. The line or sting is kept in tension during the operation of the craft as a result of the air pressure formed within the shroud 130.

Alternative actuation means may be used. For example the petals 501, 502, may themselves be fabricated of a piezoelectric polymer or ceramic and be directly actuated by electrical means. Alternatively the petals may be made constructed so as to employ magnetostriction effects. As yet another alternative, the petals may be constructed so as to change their shape, and thereby actuate, upon the application of heat (ie using shape memory materials, or bimetallic strip construction) such heat being applied directly by electrical means to the petal.

The actuators 603 are connected to the actuating ring 601 by pivoted levers, 606 and 607.

The actuators are electrically powered and controlled by means of a control unit (not shown).

By suitable control of the actuators 603, the control ring is displaced to the right as seen in FIG. 11. This pulls the tethers connected to the petals, 502, on the left side of the shroud so as to move those petals inwardly towards the centroid 521 of the fluid exit area. As a result of the overlap between the innermost and outermost petals, the adjacent petals, 501, are also pulled towards the centroid when the petals 502 are pulled. Conversely, the tension in the tethers on the right hand side of the centroid are relieved and the corresponding petals move to the right as a result mainly of the air pressure experience by the shroud. It will also be noted that the petals that are shown at the top and bottom of the shroud (as viewed in FIG. 11) move radially inwardly (if to the left of the centroid) or radially outwardly (if to the right of the centroid). This motion ensures that shear stresses in the shroud are minimized thereby reducing the actuating forces required to displace the shroud and improving the response time for actuation of the shroud. FIG. 11 shows the centroid of the fluid exit area of the shroud 130 moving from point 521 to 522.

By suitable control of the actuators 603, the actuating ring 601 may be caused to rotate about its axis, as can be seen in FIG. 12.

In this case the fluid exit area of the shroud 130 is reduced. The control of the fluid exit area 136 provides a degree of thrust control for the craft 100 and can be combined with the displacement of the centroid of the fluid exit area 136.

The shroud 130 shown has an outer diameter of approximately 600 mm. The applicant has found that good controllability (also referred to as "authority") can be achieved by using 18 inner petals, 501, and 18 outer petals, 502. Whilst other numbers of petals can be used, a practical compromise will be found between a large number which will provide increased control resolution but with increased complexity for tethering to the control ring, and a low number with reduced authority but a lower number of tethers required.

FIGS. 13a, 13b and 13c show a top view, a side view and an isometric view, respectively, of the exit region of a shroud 130 whilst in the neutral position (corresponding to that shown in FIG. 10).

Similarly, FIGS. 14a, 14b and 14c show the shroud 130 in a deflected orientation wherein the exit area of the shroud 130 is translated to the left (corresponding to FIG. 11).

It will be noted that each such petal is free to move radially inward and outward as a result of its inherent flexibility. Ideally the choice of material for the petals is such that upon actuation they are able to bend without requiring excessive actuation forces whilst at the same time being of sufficient rigidity so as to provide a smooth transition of the airflow across their inner surface.

Although a number of embodiments have been described, it will be appreciated that the invention is not only applicable to aerodynamic lifting devices and is not necessarily limited to a circular shroud as has been exemplified in the description.

Other modifications and variations of the fluid dynamic device of the invention may be apparent to skilled readers of this disclosure. Such modifications and variations are deemed within the scope of the present invention.

The invention claimed is:

1. An airborne craft incorporating a fluid dynamic device for directing fluid flow to generate thrust, the fluid dynamic device comprising a thrust control shroud disposed about a central axis of said fluid dynamic device for directing a fluid flow between an upstream fluid intake region and a downstream fluid exit region, forming a fluid exit area, of said shroud to generate thrust wherein the degree of flexibility of said shroud is sufficient to enable displacement of said fluid exit region of said shroud with respect to said central axis resulting in a translation of said fluid exit area, the fluid dynamic device further comprising at least a powered fan for generating air flow that enters said fluid intake region of the shroud, is directed by the shroud, and exits the shroud at the fluid exit region, wherein said fluid exit region of said shroud is defined by a plurality of shroud portions and each of said shroud portions is configured such that a translation of said fluid exit region results in a radial displacement of each said shroud portion with respect to said central axis, such displacement being in a predominantly inward or outward direction; and wherein said shroud portions are in the form of flexible, independently movable petals, such that the level of shear stress induced in that part of the shroud disposed parallel to the direction of translation of the shroud is minimized wherein said petals are actuated by an actuation means and said actuation means comprises an actuating ring and a plurality of actuators, at least one actuator allowing control of rotation of said actuating ring about said central axis.

2. An airborne craft according to claim 1 wherein said displacement of said fluid exit region of said shroud results in at least some lateral portion of said fluid exit region of said shroud being displaced inwardly while at least another portion of said fluid exit region of said shroud is displaced outwardly and wherein a displacement of said fluid exit region results in a change of position of the center of thrust acting on the fluid dynamic device.

3. An airborne craft according to claim 1 wherein translation of the fluid exit region of said shroud by an actuating means in a first direction results in an inward displacement of those petals that are disposed parallel to said first direction.

4. An airborne craft according to claim 3 wherein translation of the fluid exit region of said shroud results in at least some petals moving outwardly and at least another petal moving inwardly.

5. An airborne craft according to claim 1 wherein said petals are hinged at an upper region and petal movement is accommodated by an integral hinge.

6. An airborne craft according to claim 1 wherein peripherally disposed petals form the shroud and wherein each petal is disposed between adjacent petals.

7. An airborne craft according to claim 1 wherein each petal overlaps with, and is sealingly engaged with, an adjacent petal.

8. An airborne craft according to claim 1 wherein said petals are formed by a series of castellations in said shroud with each alternate (odd numbered) inner petal being disposed inward of a series of outer (even numbered) petals.

9. An airborne craft according to claim 8 wherein said petals are actuated by an actuation means and said actuation means comprises an actuating ring, actuated by at least one actuator, said actuating ring having connection means connecting said actuating ring to at least one petal wherein movement of the actuating ring by said at least one actuator results in movement of said at least one petal.

10. An airborne craft according to claim 9 wherein each of said outer petals is connected to said actuating ring by individual connection means wherein radially inward displacement of an outer petal, due to overlap between the petals, pulls at least adjacent inner petals inwardly.

11. An airborne craft according to claim 1 wherein a control system controls at least one of said actuators so as to produce both a constriction of said fluid exit area and a translation of said fluid exit area with respect to said central axis of said fluid dynamic device, said constriction modulating thrust output from said fluid dynamic device.

12. An airborne craft according to claim 1 wherein said shroud has a neutral position wherein predominately all of the fluid exiting the fluid exit region of said shroud is directed towards a centroid of said fluid exit region of said fluid dynamic device and fluid entering said fluid intake region of said shroud enters in a radial direction to said central axis of said fluid dynamic device.

13. An airborne craft according to claim 1 wherein said powered fan is a rotor in the form of a drum rotor.

14. An airborne craft according to claim 1 wherein the air flow is directed downward through an annular shaped fluid exit region to generate thrust.

15. An airborne craft according to claim 1 wherein fluid exiting the fluid exit region is directed at an acute angle, preferably between 45 and 90 degrees, towards said central axis of said shroud.

16. An airborne craft according to claim 1 wherein fluid flow directed between said upstream fluid intake region and said downstream fluid exit region is directed through a total angle of greater than 90 degrees.

17. An airborne craft according to claim 1 wherein said petals are actuatable throughout said range of movements of said shroud, said movements being accommodated by flexural hinges comprised within said petals.

\* \* \* \* \*

UNITED STATES PATENT AND TRADEMARK OFFICE
CERTIFICATE OF CORRECTION

PATENT NO. : 8,646,721 B2  Page 1 of 1
APPLICATION NO. : 12/990964
DATED : February 11, 2014
INVENTOR(S) : Chapman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 472 days.

Signed and Sealed this
Twenty-ninth Day of September, 2015

Michelle K. Lee
*Director of the United States Patent and Trademark Office*